(12) United States Patent
Wan et al.

(10) Patent No.: US 9,807,761 B2
(45) Date of Patent: Oct. 31, 2017

(54) METHOD AND APPARATUS FOR CHANNEL ESTIMATION

(71) Applicant: Huawei Technologies Co., Ltd., Shenzhen (CN)

(72) Inventors: Lei Wan, Beijing (CN); Xingqing Cheng, Beijing (CN); Mingyu Zhou, Beijing (CN); Yajun Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 14/811,360

(22) Filed: Jul. 28, 2015

(65) Prior Publication Data
US 2015/0333934 A1 Nov. 19, 2015

Related U.S. Application Data

(60) Continuation of application No. 13/919,538, filed on Jun. 17, 2013, now Pat. No. 9,125,199, which is a
(Continued)

(30) Foreign Application Priority Data

Nov. 12, 2008 (CN) .......................... 2008 1 0226468

(51) Int. Cl.
*H04W 72/04* (2009.01)
*H04L 25/02* (2006.01)
(Continued)

(52) U.S. Cl.
CPC ......... *H04W 72/044* (2013.01); *H04L 5/0035* (2013.01); *H04L 5/0048* (2013.01);
(Continued)

(58) Field of Classification Search
CPC ............ H04W 72/044; H04W 72/0433; H04L 5/0035; H04L 5/0048; H04L 25/0204;
(Continued)

(56) References Cited

U.S. PATENT DOCUMENTS 7,729,237 B2    6/2010  Lee et al.
2006/0009227 A1  1/2006  Cudak et al.
(Continued)

FOREIGN PATENT DOCUMENTS

CN    1960353 A    5/2007
CN    101026606 A   8/2007
(Continued)

OTHER PUBLICATIONS

3GPP TSG RAN WG1 Meeting #55 R1-084203,"Consideration on CoMP in LTE-Advanced", LG Electronics, Nov. 10-14, 2008,total 6 pages.
(Continued)

*Primary Examiner* — Obaidul Huq

(57) ABSTRACT

To facilitate sending a reference signal in a wireless communication environment, a transmitter sends a reference signal in a first time-frequency resource to a user equipment (UE); the transmitter sends data information in a first portion of a second time-frequency resource different from the first time-frequency resource to the UE; and the transmitter excludes data information from being sent in a second portion of the second time-frequency resource. The second portion of the second time-frequency resource is designated for use by another transmitter for sending another reference signal to the UE.

16 Claims, 14 Drawing Sheets

Related U.S. Application Data division of application No. 13/454,804, filed on Apr. 24, 2012, now Pat. No. 8,483,619, which is a continuation of application No. 13/106,054, filed on May 12, 2011, now Pat. No. 8,260,211, which is a continuation of application No. PCT/CN2009/074915, filed on Nov. 12, 2009.

(51) Int. Cl.
*H04J 11/00* (2006.01)
*H04L 5/00* (2006.01)

(52) U.S. Cl.
CPC ...... *H04L 25/0204* (2013.01); *H04L 25/0224* (2013.01); *H04W 72/0433* (2013.01); *H04J 11/0023* (2013.01); *H04L 5/0007* (2013.01)

(58) Field of Classification Search
CPC ............... H04L 25/0224; H04L 5/0007; H04L 25/0202; H04J 11/0023
USPC .................................. 370/310, 328, 329, 330
See application file for complete search history.

(56) References Cited

U.S. PATENT DOCUMENTS

| | | |
|---|---|---|
| 2006/0120272 A1 | 6/2006 | Wang et al. |
| 2007/0133462 A1 | 6/2007 | Guey |
| 2008/0232240 A1 | 9/2008 | Baum et al. |
| 2009/0011767 A1 | 1/2009 | Malladi et al. |
| 2009/0168730 A1 | 7/2009 | Baum et al. |
| 2009/0176463 A1 | 7/2009 | Raaf et al. |
| 2009/0285173 A1 | 11/2009 | Koorapaty et al. |
| 2009/0322613 A1 | 12/2009 | Bala et al. |
| 2010/0014481 A1 | 1/2010 | Ko et al. |
| 2010/0035555 A1 | 2/2010 | Bala et al. |
| 2012/0208577 A1 | 8/2012 | Wan et al. |

FOREIGN PATENT DOCUMENTS

| | | |
|---|---|---|
| CN | 101263679 A | 9/2008 |
| CN | 101373999 A | 2/2009 |
| CN | 101374133 A | 2/2009 |
| JP | 2008150455 A | 7/2008 |
| WO | 0133744 A1 | 5/2001 |
| WO | 2007020512 A2 | 2/2007 |
| WO | 2008057898 A2 | 5/2008 |
| WO | 2010054593 A1 | 5/2010 |

OTHER PUBLICATIONS

3GPP TS36.211 V8.4.0,3rd Generation Partnership Project;Technical Specification Group Radio Access Network; Evolved Universal Terrestrial Radio Access (E-UTRA);Physical Channels and Modulation(Release 8),Sep. 2008, total 78 pages.

3GPP TSG RAN WG1 Meeting #55bis R1-090317,"Support of DL Higher-Order MIMO Transmission in LTE-Advanced",NTT Docomo,(Original R1-083685),Jan. 12-16, 2009,total 9 pages.

3GPP TSG RAN1 #55 R1-084447,"Common Reference Symbol Mapping/Signaling for 8 Transmit Antenna",Texas Instruments, Nov. 10-14, 2008,total 6 pages.

Yang Yu et al.,"Pilot Design and Channel Estimation in Multi-Cell MIMO OFDM Systems",Journal of Beijing University of Posts and Telecommunications,vol .31 No. 1,Feb. 2008,total 5 pages.

Zhou Peng et al.,"Channel Estimation Based on Pilot-Assisted for MIMO-OFDM Systems",Journal of Electronics & Information Technology,vol. 29No.1,Jan. 2007,total 5 pages.

3GPP TSG RAN WG1 Meeting #54bis R1-083611,"Consideration on COMP antenna port mapping in LTE-A",ZTE, Sep. 29-Oct. 3, 2008,total 7 pages.

3GPP TSG RAN WG1#54 R1-083049,"Consideration on CoMP for LTE-Advanced",Huawei,Aug. 18-22, 2008,total 3 pages.

3GPP TSG RAN WG1 meeting #62bis R1-105132,"Proposal for specification of PDSCH Muting",Huawei et al.,Oct. 11-15, 2010,total 6 pages.

3GPP TS 36.213 V8.4.0,3rd Generation Partnership Project;Technical Specification Group Radio Access Network; Evolved Universal Terrestrial Radio Access (E-UTRA);Physical layer procedures(Release 8),Sep. 2008,total 60 pages.

3GPP TR 25.814 V7.1.0,3rd Generation Partnership Project;Technical Specification Group Radio Access Network; Physical layer aspects for evolved Universal Terrestrial Radio Access (UTRA)(Release 7),Sep. 2006,total 132 pages.

METHOD AND APPARATUS FOR CHANNEL ESTIMATION

CROSS-REFERENCE TO RELATED APPLICATIONS

This application is a continuation of U.S. patent application Ser. No. 13/919,538, filed on Jun. 17, 2013, now allowed, which is a divisional application of U.S. patent application Ser. No. 13/454,804, filed on Apr. 24, 2012, now U.S. Pat. No. 8,483,619, which is a continuation of U.S. patent application Ser. No. 13/106,054, filed on May 12, 2011, now U.S. Pat. No. 8,260,211, which is a continuation of International Application No. PCT/CN2009/074915, filed on Nov. 12, 2009. The International Application claims priority to Chinese Patent Application No. 200810226468.7, filed on Nov. 12, 2008. The afore-mentioned patent applications are hereby incorporated by reference in their entireties.

TECHNICAL FIELD

The present disclosure relates to communication technologies, and in particular, to a method and an apparatus for channel estimation.

BACKGROUND

In a radio communication system, Coordinated Multi-Point (CoMP) transmission is a technology for improving overall performance of a cell and performance of users at the edge of the cell. Downlink CoMP transmission is a technology for multiple geographically distributed transmitters to jointly send data to a User Equipment (UE). In a CoMP system, network nodes include an evolved NodeB (eNodeB) and several Access Points (APs). An AP is a node that includes at least a radio frequency transceiver, and one or more antenna units can be configured on the AP. Multiple APs are geographically distributed and connected to the eNodeB, and can coordinate to transmit or receive data from the UE. The cooperative APs may be connected with a same eNodeB or different eNodeBs. In a CoMP system, multiple cooperative cells/APs send a same signal to the UE jointly, which enhances the power of the UE for receiving the signal and improves the performance of the UEs at the edge of the cells/APs. However, to receive signals from multiple cooperative cells/APs effectively, the UE needs to estimate the channel value between the UE and the cooperative cells/APs accurately.

In a Long Term Evolution (LTE) system, a reference signal pattern is put forward. The reference signal pattern includes common reference signals and dedicated reference signals. The common reference signals always exist, and are bound to a cell identity (ID); and the dedicated reference signals are bound to a UE ID and a cell ID.

In the conventional art, dedicated pilot frequencies are generally used to implement CoMP applications. In this way, the CoMP system is well compatible with the LTE system, without any extra signaling overhead. However, if the reference signal pattern provided by the LTE system is applied to the CoMP system, when multiple cooperative cells/APs serve a UE jointly, the reference signal interferes with the data signal reciprocally for every two cooperative cells/APs. Consequently, the UE is unable to estimate the channel value between the UE and the cooperative cells/APs accurately, which affects the performance of the UE seriously.

SUMMARY

According to a first aspect of the present disclosure, a method that facilitates sending a reference signal in a wireless communication environment is provided. The method includes sending, by a transmitter, a reference signal in a first time-frequency resource to a user equipment (UE), sending, by the transmitter, data information in a first portion of a second time-frequency resource different from the first time-frequency resource to the UE, and excluding, by the transmitter, data information from being sent in a second portion of the second time-frequency resource, the second portion of the second time-frequency resource being designated for use by another transmitter for sending another reference signal to the UE.

According to a second aspect of the present disclosure, a method that facilitates estimating a reference signal in a wireless communication environment is provided. The method includes receiving, from a first transmitter, a first reference signal in a first time-frequency resource; receiving, from the first transmitter, data information in a first portion of a second time-frequency resource different from the first time-frequency resource, data information from the first transmitter being excluded from being sent in a second portion of the second-time frequency resource; receiving, from a second transmitter, a second reference signal in the second portion of the second time-frequency resource; and performing channel estimation based on the first reference signal and the second reference signal.

According to a third aspect of the present disclosure, a wireless communications apparatus is provided. The apparatus includes: a memory for storing instructions and a processor coupled to the memory configured to execute the instructions to allow the apparatus to send a reference signal in a first time-frequency resource to a user equipment (UE), send data information in a first portion of a second time-frequency resource different from the first time-frequency resource to the UE, and exclude data information from being sent in a second portion of the second time-frequency resource, the second portion of the second time-frequency resource being designated for use by another wireless communication apparatus sending another reference signal to the UE.

According to a fourth aspect of the present disclosure, a wireless communications apparatus is provided. The apparatus includes a transmitter configured to send a reference signal in a first time-frequency resource to a user equipment (UE), send data information in a first portion of a second time-frequency resource different from the first time-frequency resource to the UE, and a processor communicatively connected to the transmitter configured to exclude data information from being sent in a second portion of the second time-frequency resource, the second portion of the second time-frequency resource being designated for use by a transmitter on another wireless communication apparatus for sending another reference signal to the UE.

According to a fifth aspect of the present disclosure, a wireless communications apparatus is provided. The apparatus includes a memory for storing instructions; and a processor coupled to the memory configured to execute the instructions to allow the apparatus to receive, from a first transmitter, a first reference signal in a first time-frequency resource; receive, from the first transmitter, data information in a portion of a second time-frequency resource different from the first time-frequency resource, data information from the first transmitter being excluded from being sent in a second portion of the second-time frequency resource;

receive, from a second transmitter, a second reference signal in the second portion of the second time-frequency resource; and perform channel estimation based on the first reference signal and the second reference signal.

According to a sixth aspect of the present disclosure, a wireless communications apparatus is provided. The apparatus includes: a receiver configured to receive, from a first transmitter, a first reference signal in a first time-frequency resource; receive, from the first transmitter, data information in a portion of a second time-frequency resource different from the first time-frequency resource, data information being excluded from being sent in a second portion of the second time-frequency resource; receive, from a second transmitter, a second reference signal in the second portion of the second time-frequency resource; and a processor communicatively connected to the receiver configured to perform channel estimation based on the first reference signal and the second reference signal.

DETAILED DESCRIPTION OF THE EMBODIMENTS

The following detailed description is given with reference to the accompanying drawings to provide a thorough understanding of the present disclosure. Evidently, the drawings and the detailed description are merely representative of particular embodiments of the present disclosure rather than all embodiments. All other embodiments, which can be derived by those skilled in the art from the embodiments given herein without any creative effort, shall fall within the scope of the present disclosure.

The technical solution under the present disclosure is expounded below with reference to accompanying drawings and preferred embodiments.

The relation between an AP and a traditional cell is: A cell includes one or more APs. When the reference signals change per cell, a relative shift exists between reference signals of every two cooperative cells; when the reference signals change per AP, a relative shift exists between reference signals of every two cooperative APs. In the following embodiments, it is assumed that the reference signals change per AP, and that the processing mode is similar when the reference signals change per cell.

Figure 1A:
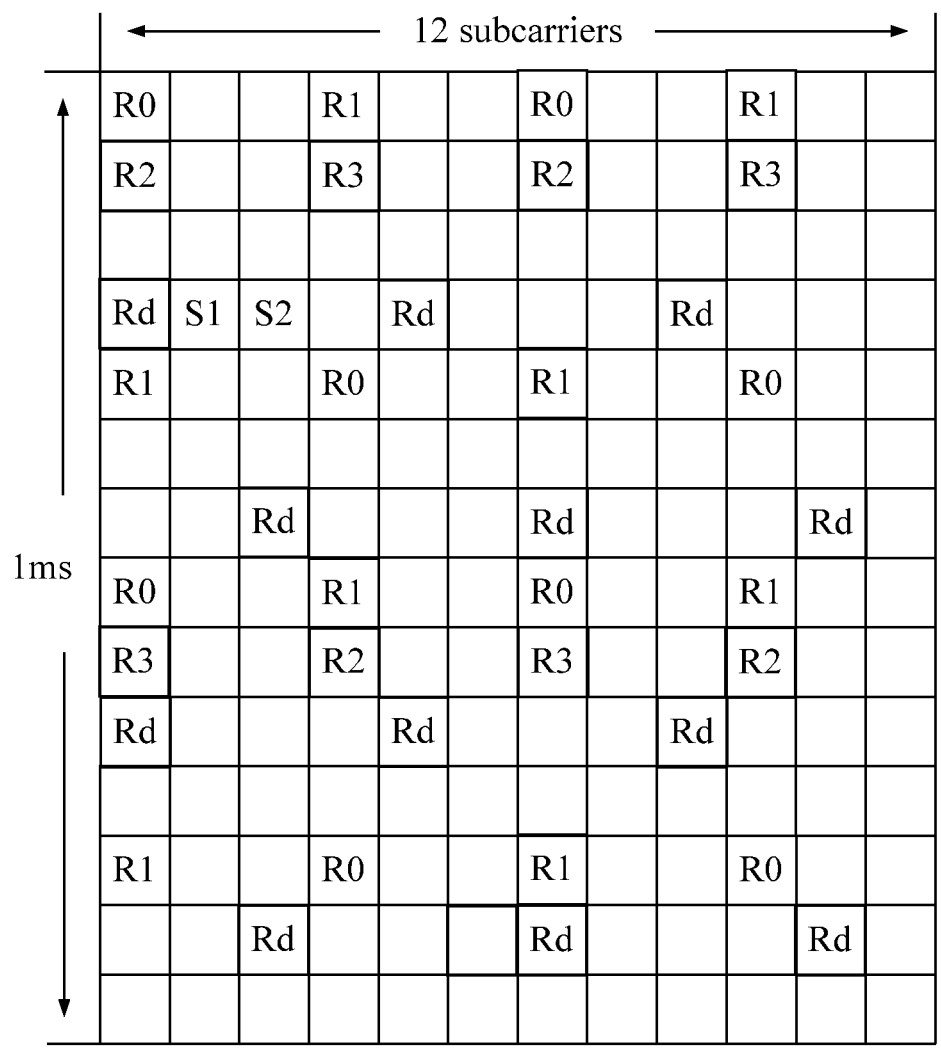
FIG. 1A shows reference signals of a first AP in an LTE system according to an embodiment of the present disclosure.
Figure 1B:
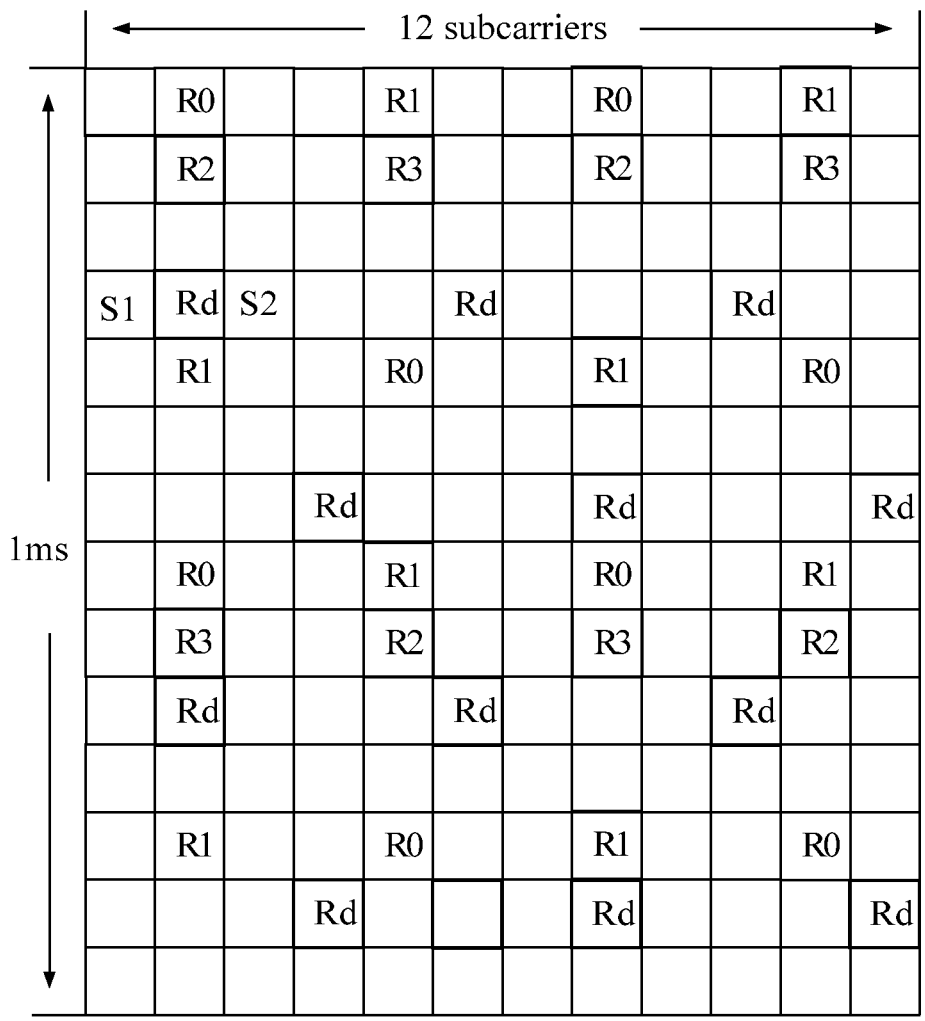
FIG. 1B shows reference signals of a second AP in an LTE system according to an embodiment of the present disclosure.

FIG. 1A and FIG. 1B show reference signals of the first AP and the second AP in an LTE system in an embodiment of the present disclosure, and show a pattern of a subframe in the first AP and the second AP which serve the same UE. In FIG. 1A and FIG. 1B, a row represents a time domain, and a column represents a frequency domain. Specifically, different rows represent different Orthogonal Frequency Division Multiplexing (OFDM) symbol domains. The figure shows 14 rows in total, which represent 1 ms. Different columns represent different subcarriers. The figure shows 12 columns in total, which represent 12 subcarriers. R0, R1, R2 and R3 represent the common reference signals of ports 0-3 respectively; Rd represents a dedicated reference signal; and S1 and S2 are data signals. As shown in FIG. 1A and FIG. 1B, for two different APs, a relative frequency shift exists between the common reference signal and the dedicated reference signal.

In the following embodiments, by changing the mode of the reference signals shown in FIG. 1A and FIG. 1B, the method put forward herein changes the sending mechanism of the cooperative APs and the receiving mechanism of the UE, and solves mutual interference between the reference signal and the data signal. A preliminary step performed before the steps of the following embodiments is: eNodeB judges whether the UE is in cooperative mode, namely, whether multiple cooperative APs serve one UE; if not, the AP sends reference signals shown in FIG. 1A and FIG. 1B to the UE; if so, the AP performs the steps of the following embodiments. Further, if the eNodeB determines that the UE changes from the non-cooperative mode to the cooperative mode, namely, one AP serving a UE changes to multiple cooperative APs serving the UE, the method in this embodiment further includes: When multiple cooperative APs belong to the same eNodeB, the eNodeB instructs multiple cooperative APs to change the mode of the reference signals, and the multiple cooperative APs instruct the UE to change the mode of the reference signals. When multiple cooperative APs belong to different eNodeBs, the eNodeBs instruct each other to change the mode of the reference signals, and instruct the multiple cooperative APs to change the mode of the reference signals. Moreover, the multiple cooperative APs instruct the UE to change the mode of the reference signals.

It should be noted that in the embodiments of the present disclosure, the downlink signals include control channel symbol domains and data channel symbol domains. Generally, several initial rows represent control channel symbol domains, and the remaining rows are data channel symbol domains. In the subframes shown in FIG. 1A and FIG. 1B, the first two rows represent the control channel symbol domain, and other rows are data channel symbol domains. While the AP delivers downlink signals, the number of rows corresponding to the control channel symbol domains is variable. That is, in different subframes, the number of rows corresponding to the control channel symbol domains may differ. A "preset symbol domain" involved in the following embodiments refers to the symbol domain to be most probably occupied by the control channel. For certain subframes, the number of rows corresponding to the control channel symbol domain is less than the number of rows corresponding to the preset symbol domain. Therefore, the preset symbol domain may also include data signals.

Figure 2:
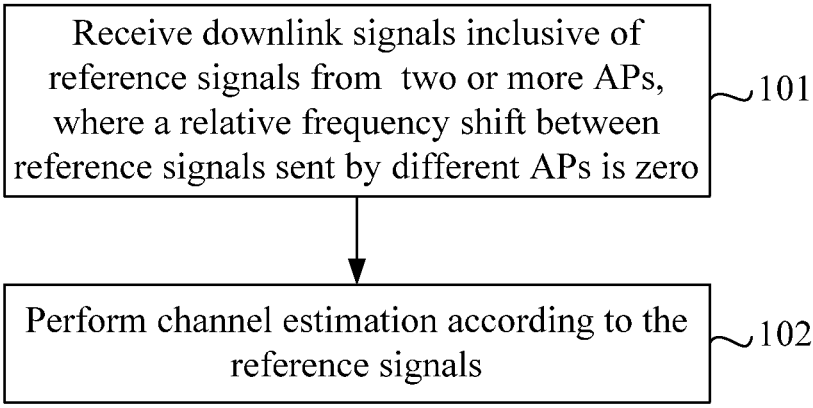
FIG. 2 is a flowchart of a channel estimation method provided according to a first embodiment of the present disclosure.

One embodiment of a channel estimation method is described in FIG. 2. FIG. 2 is a flowchart of a channel estimation method provided in the first embodiment of the present disclosure. The method includes the following steps:

Step 101: Receive downlink signals inclusive of reference signals from two or more APs, where a relative frequency shift between reference signals sent by different APs is zero.

When this embodiment is applied in a CoMP system, the UE receives the downlink signals sent by two or more cooperative APs. This embodiment changes the mode of the reference signals shown in FIG. 1A and FIG. 1B so that no relative frequency shift exists between the reference signals sent by different APs, namely, the relative frequency shift is zero. The cooperative APs send the reference signals to the UE according to the sending mechanism corresponding to the changed reference signals, and the UE receives the reference signals according to the receiving mechanism corresponding to the changed reference signals.

Step 102: Perform channel estimation according to the reference signals.

This embodiment is applicable to the scenario where two or more cooperative APs send the same data signal to the UE, and applicable to the scenario where two or more cooperative APs send different data signals to the UE.

No relative frequency shift exists between the reference signals sent by different APs. Therefore, the reference signal does not interfere with the data signal reciprocally, the UE can estimate the channel value between the UE and the cooperative APs accurately, and the UE performance is improved.

Figure 3A:
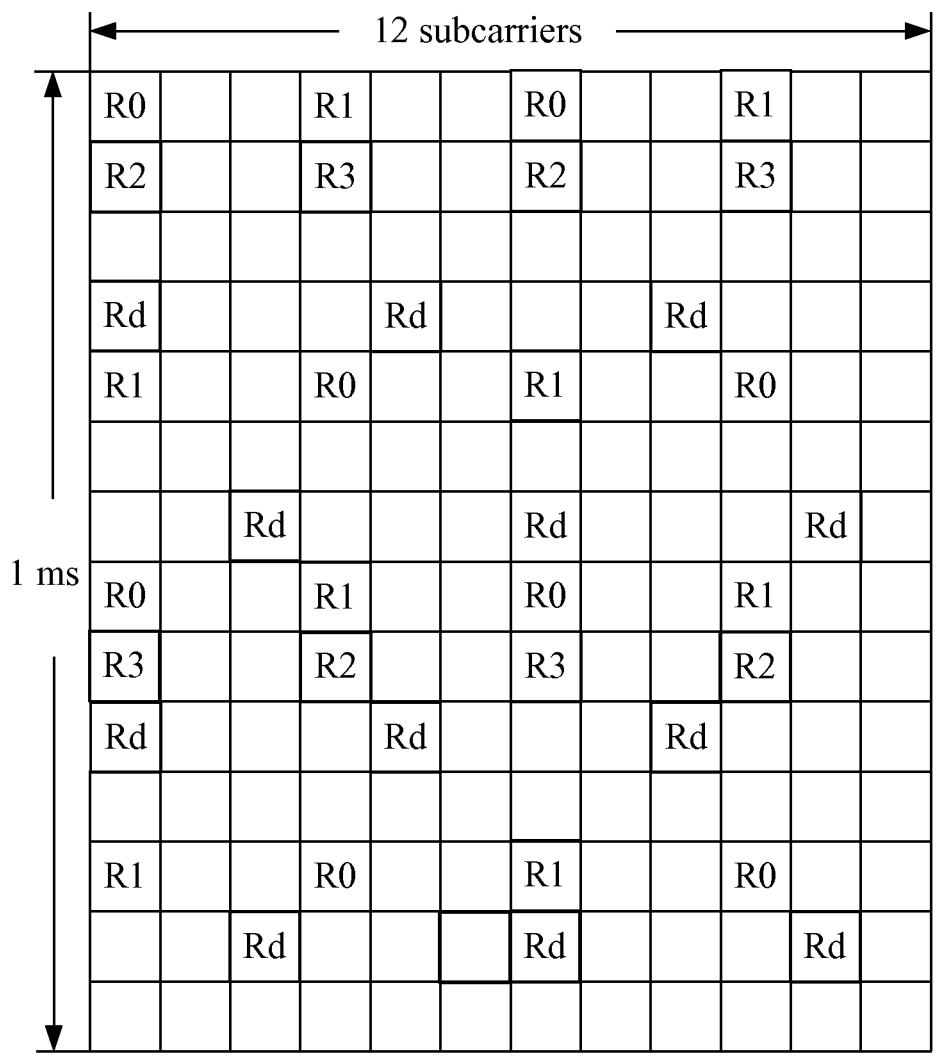
FIG. 3A shows reference signals of a first AP in a channel estimation method provided according to a second embodiment of the present disclosure.
Figure 3B:
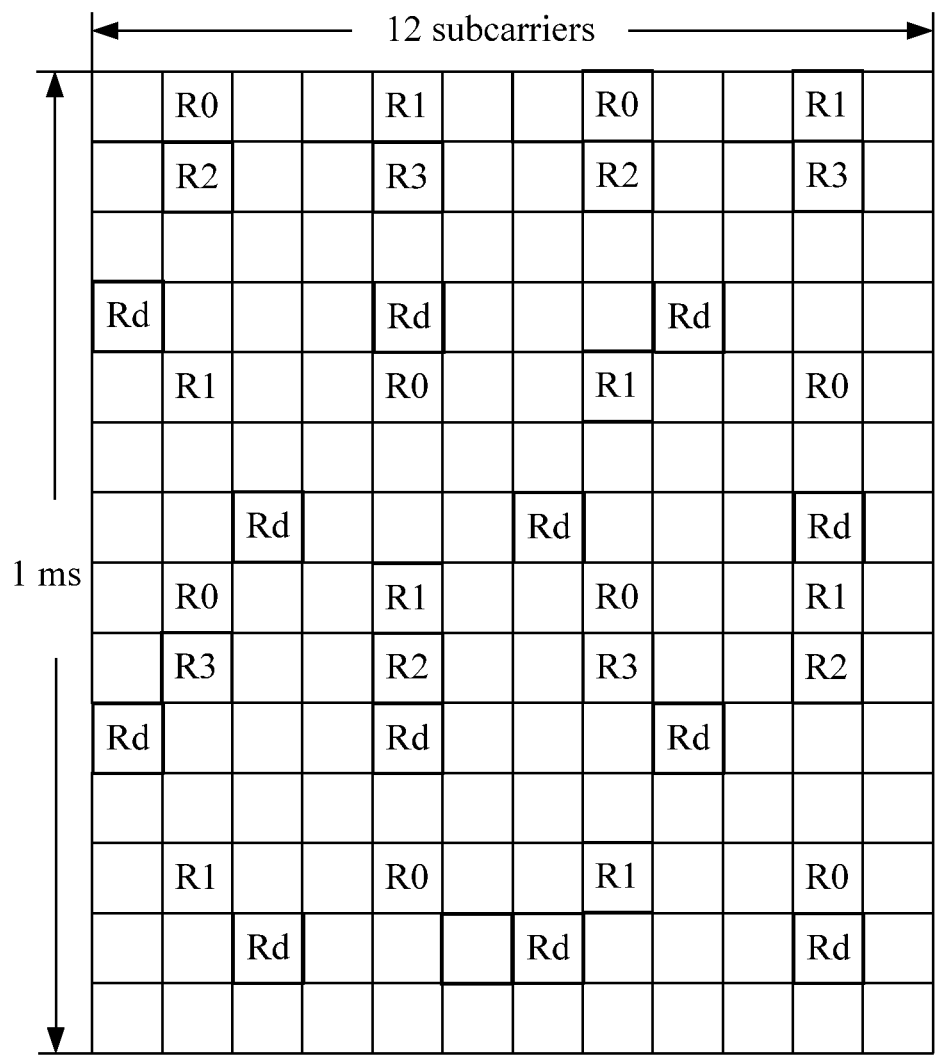
FIG. 3B shows reference signals of a second AP in a channel estimation method provided according to the second embodiment of the present disclosure.

The second embodiment of a channel estimation method is described below:

FIG. 3A and FIG. 3B show reference signals of a first AP and a second AP respectively in a channel estimation method in the second embodiment of the present disclosure. The processing method in this embodiment is the same as that in the first embodiment above. This embodiment gives details about how to change the mode of the reference signals.

Dedicated reference signals are taken as an example here. It is assumed that any two APs among two or more APs are a first AP and a second AP. The two APs are the cooperative APs that serve the same UE. FIG. 3A and FIG. 3B show the reference signals of the first AP and the second AP respectively. In comparison with FIG. 1B, the frequency shift of the dedicated reference signals of the second AP in FIG. 3B has changed. No relative frequency shift exists between the dedicated reference signal of the first AP and that of the second AP, namely, the relative frequency shift between the dedicated reference signal of the first AP and that of the second AP is zero. In this way, when the cooperative APs send the same downlink signal to the UE to enhance the signal, the UE can estimate the channel value between the UE and the cooperative APs accurately according to the dedicated reference signal, and then estimate the aggregated channel (in other words, perform soft combining for the channels).

This embodiment may also change the frequency shift of the common reference signal of the second AP, and therefore, no frequency shift exists between the common reference signal of the first AP and that of the second AP, and the interference between the common reference signal and the data signal is eliminated. Further, the downlink signals may include no dedicated reference signal, thus eliminating interference between the dedicated reference signal and the data signal.

Figure 3C:
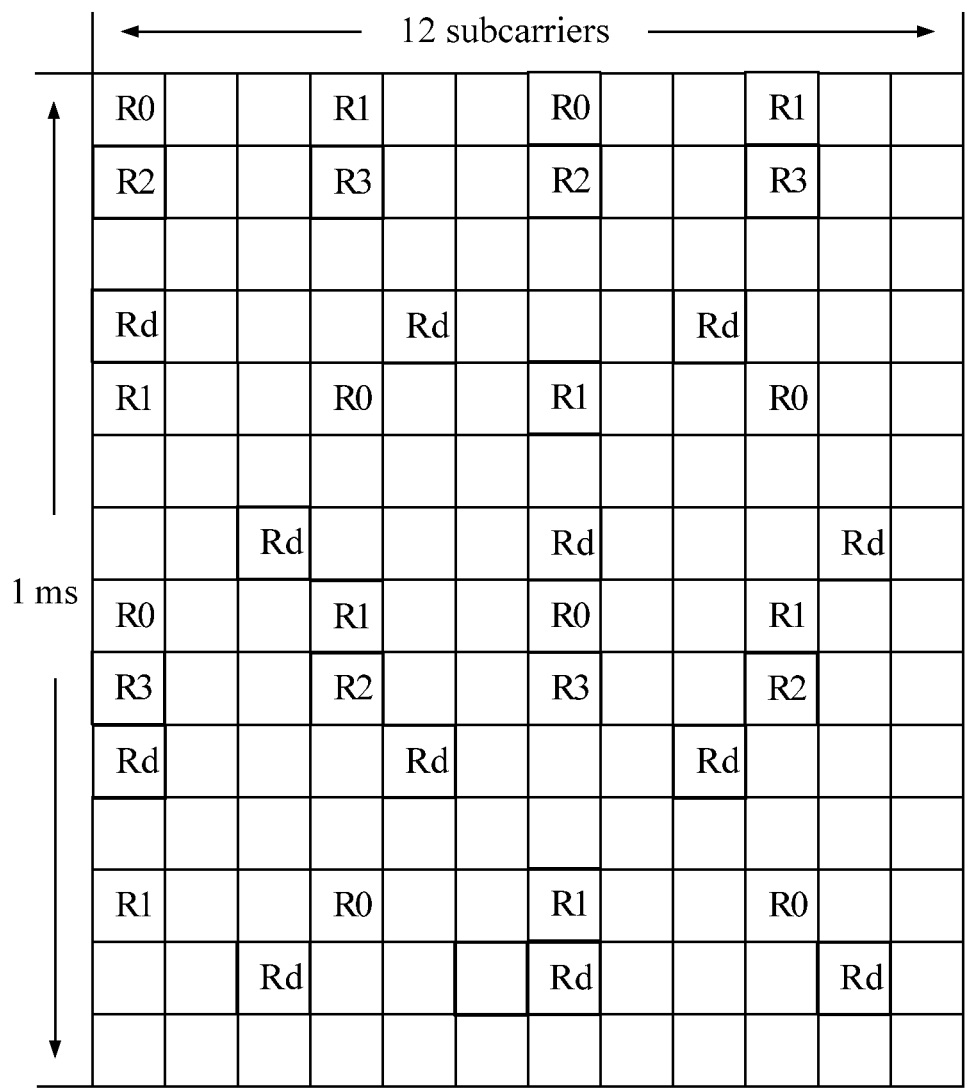
FIG. 3C shows reference signals of a first AP in a channel estimation method provided according to the second embodiment of the present disclosure.
Figure 3D:
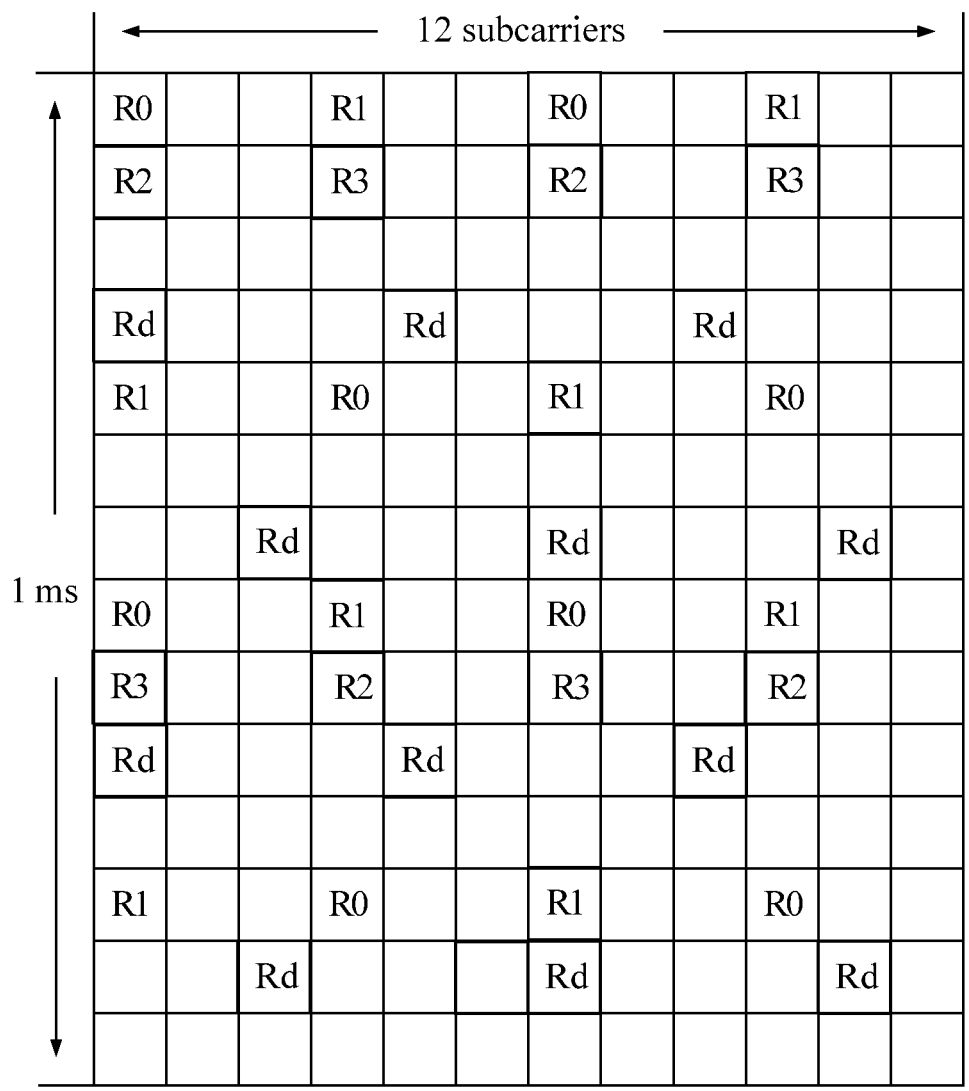
FIG. 3D shows reference signals of a second AP in a channel estimation method provided according to the second embodiment of the present disclosure.

In this embodiment, the UE can receive the common reference signal according to the receiving mechanism corresponding to the changed common reference signal, or receive the dedicated reference signal according to the receiving mechanism corresponding to the changed dedicated reference signal, thus improving the UE performance effectively. Preferably, both the relative frequency shift of the common reference signal and the relative frequency shift of the dedicated reference signal are changed in the foregoing way. FIG. 3C and FIG. 3D show reference signals of a first AP and a second AP respectively in a channel estimation method in the second embodiment of the present disclosure. This embodiment eliminates the interference between the common reference signal and the data signal, and the interference between the dedicated reference signal and the data signal. In this way, the UE can estimate the channel value between the UE and the cooperative APs accurately, and improve the performance of the UE effectively.

That is, this embodiment can receive the downlink signals in which the dedicated reference signal has a relative frequency shift but the common reference signal has no relative frequency shift; or receive the downlink signals in which the dedicated reference signal has no relative frequency shift but the common reference signal has a relative frequency shift; or receive the downlink signals in which the dedicated reference signal has no relative frequency shift and the common reference signal has no relative frequency shift.

The third embodiment of a channel estimation method is described below:

The processing method in this embodiment is the same as that in the first embodiment above. Specifically, the reference signal is a dedicated reference signal; in the same way as obtaining the dedicated reference signal in the second embodiment above, this embodiment can obtain the dedicated reference signal whose relative frequency shift is zero. Differently, this embodiment uses an interference elimination method to eliminate the interference between the common reference signal and the data signal.

Figure 4:
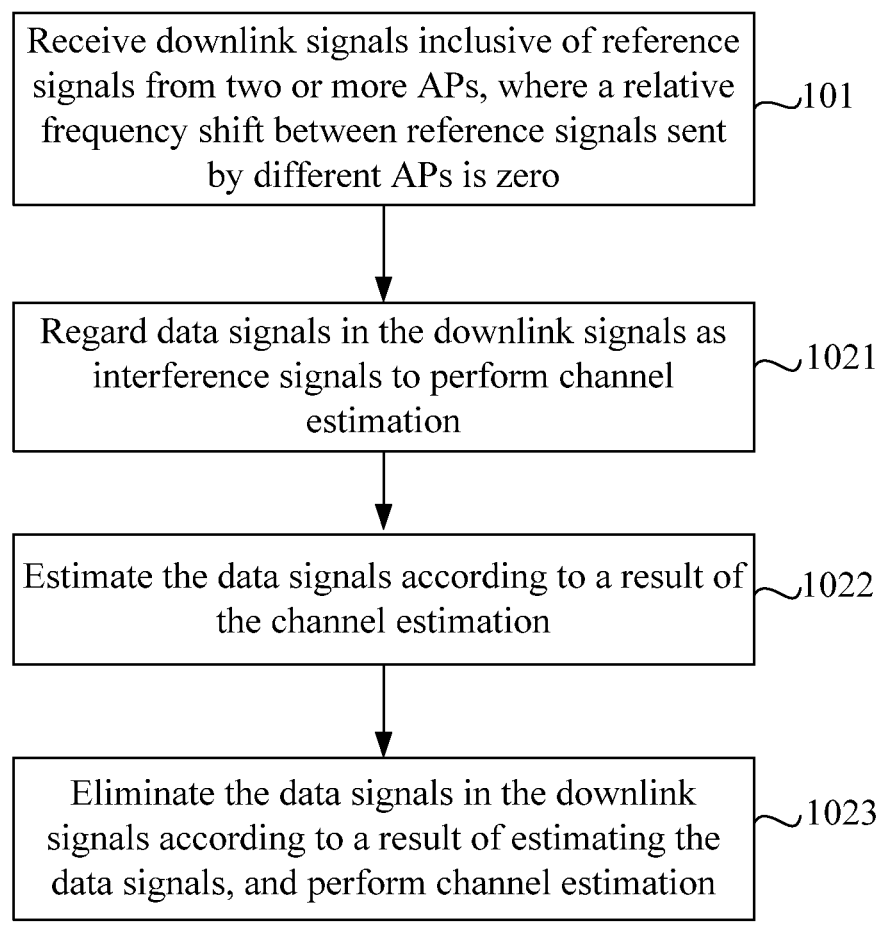
FIG. 4 is a flowchart of a channel estimation method provided according to a third embodiment of the present disclosure.

FIG. 4 is a flowchart of a channel estimation method provided in the third embodiment of the present disclosure. On the basis of the first embodiment, step 102 may include the following steps:

Step 1021: Regard data signals in the downlink signals as interference signals, and perform channel estimation.

The data signals may be regarded as interference signals to perform channel estimation.

Step 1022: Estimate the data signals according to the result of channel estimation.

Step 1023: Eliminate the data signals in the downlink signals according to the result of estimating the data signals, and perform channel estimation. Specifically, subtract estimated data signals from the downlink signals, eliminate the interference caused by the data signals, and estimate the channel again.

Steps 1021-1023 are an iterative process. To better eliminate the impact caused by the data signals, the foregoing steps may be repeated.

The fourth embodiment of a channel estimation method is described below:

The processing method in this embodiment is the same as that in the first embodiment above. Specifically, the reference signal is a dedicated reference signal; in the same way as obtaining the dedicated reference signal in the second embodiment above, this embodiment can obtain the dedicated reference signal whose relative frequency shift is zero. This embodiment differs in that: No common reference signal is included in the data channel symbol domains except the preset symbol domain in the downlink signals, so that the interference between the common reference signal and the data signal can be eliminated.

Figure 5A:
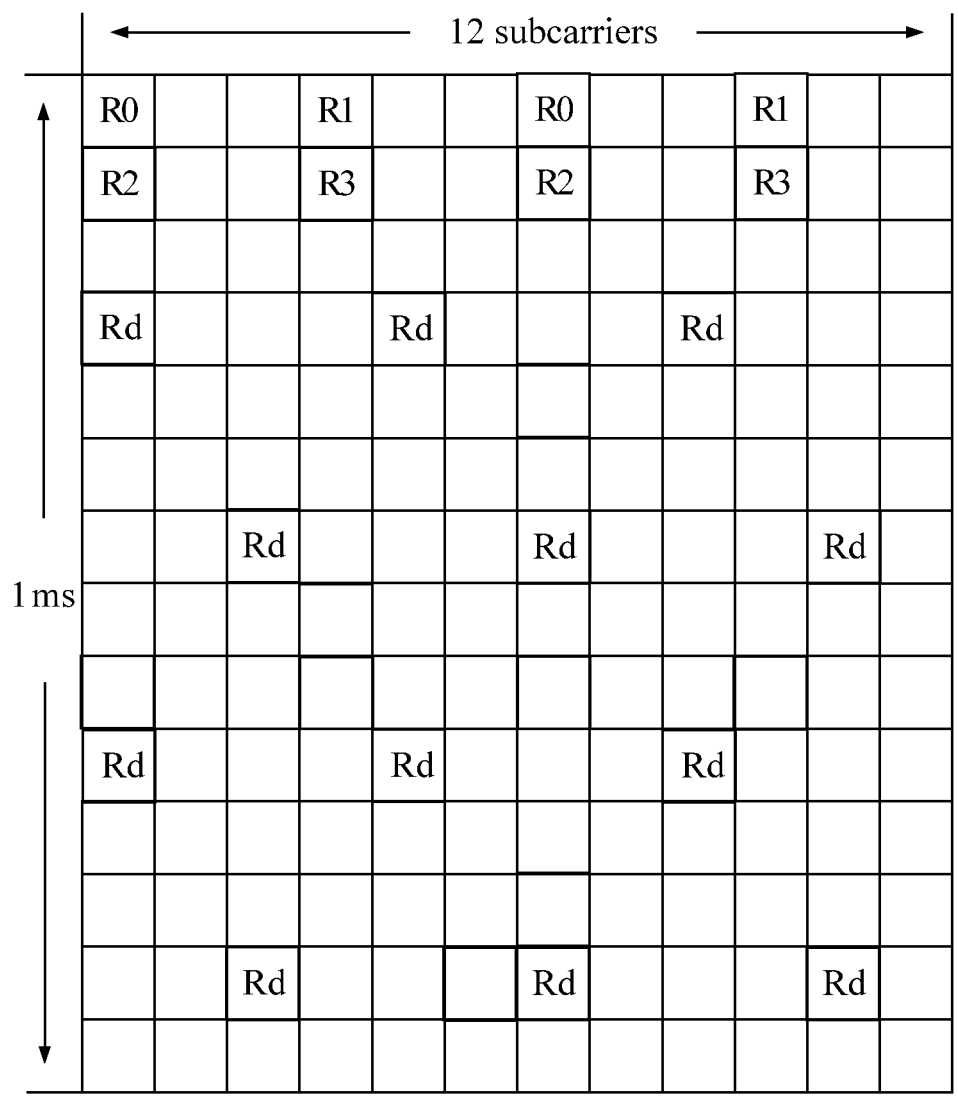
FIG. 5A shows reference signals of a first AP in a channel estimation method provided according to a fourth embodiment of the present disclosure.
Figure 5B:
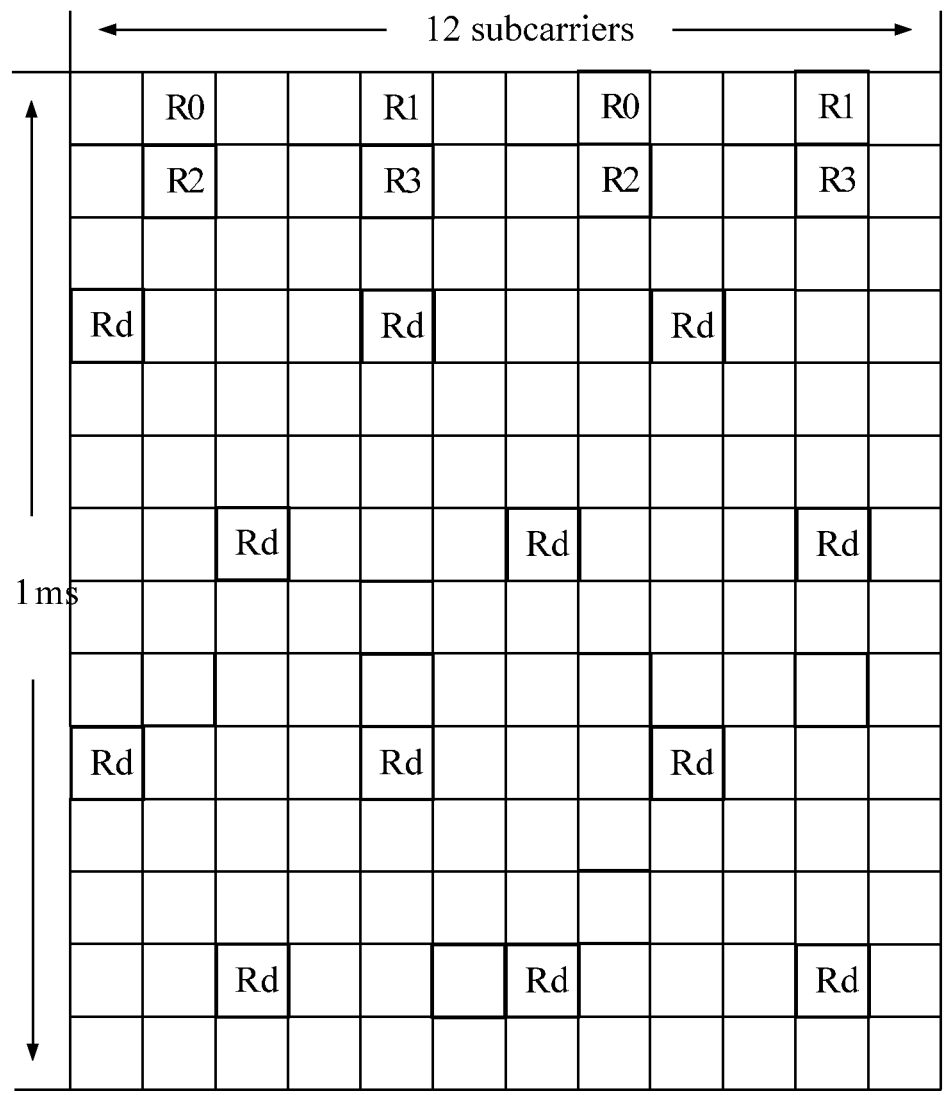
FIG. 5B shows reference signals of a second AP in a channel estimation method provided according to the fourth embodiment of the present disclosure.

FIG. 5A and FIG. 5B show reference signals of a first AP and a second AP respectively in a channel estimation method in the fourth embodiment of the present disclosure. In FIG. 5A and FIG. 5B, the first two rows are the symbol domains to be most probably occupied by the control channel, and are preset symbol domains. The symbol domains except the first two rows are data channel symbol domains. The data channel symbol domains carry no common reference signal, but carry the dedicated reference signals only. In this way, the interference between the common reference signal and the data signal is eliminated as much as possible.

Further, to eliminate the interference between the common reference signal and the data signal in the preset symbol domain, this embodiment can change the frequency shift of the common reference signal in the preset symbol domain in the second AP, and therefore, no relative frequency shift exists between the common reference signal in the preset symbol domain in the second AP and the common reference signal in the preset symbol domain in the first AP.

In another embodiment, the interference elimination method in steps 1021-1023 are applied to further eliminate the interference between the common reference signal in the preset symbol domain and the data signal.

Figure 6:
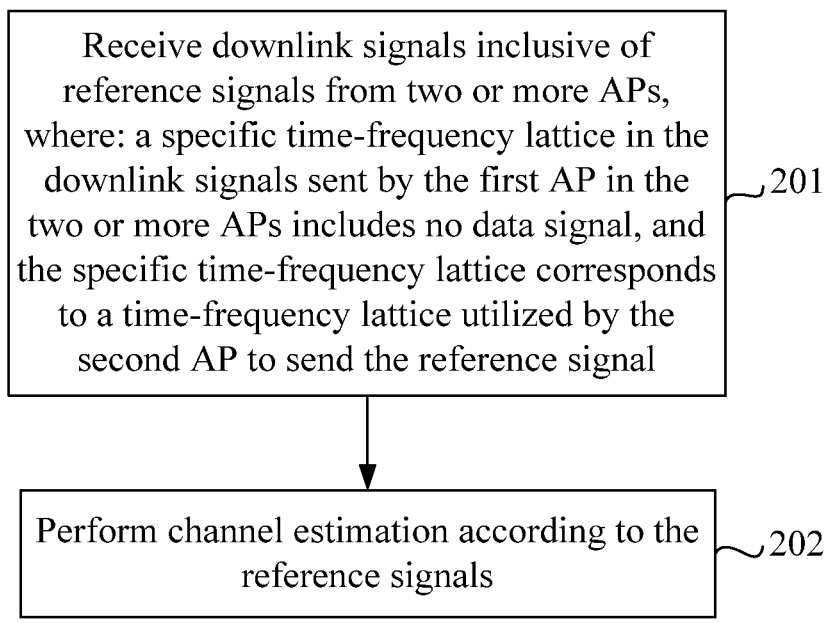
FIG. 6 is a flowchart of another channel estimation method provided according to a first embodiment of the present disclosure.

The first embodiment of another channel estimation method is described below:

FIG. 6 is a flowchart of another channel estimation method provided in a first embodiment of the present disclosure. The method includes the following steps:

Step 201: Receive downlink signals inclusive of reference signals from two or more APs. Among the two or more APs (one is a first AP, and the other is a second AP), a specific time-frequency lattice in the downlink signals sent by the first AP includes no data signal, where the specific time-frequency lattice corresponds to a time-frequency lattice utilized by the second AP to send the reference signal.

When this embodiment is applied to a CoMP system, the UE receives the downlink signals sent by two or more cooperative APs. For the downlink signals sent by each AP, if the reference signals shown in FIG. 1A and FIG. 1B are applied, no data signal is sent at specific time-frequency lattices corresponding to the time-frequency lattice of the reference signal sent by other APs. For example, if the UE receives downlink signals sent by three APs, for each of the APs, the time-frequency lattice of the reference signal sent by other two APs corresponds to the specific time-frequency lattice of this AP, and no data signal is sent at the specific time-frequency lattice of this AP. The cooperative APs send the reference signals to the UE according to the changed sending mechanism corresponding to the reference signals, and the UE receives the reference signals according to the receiving mechanism corresponding to the changed reference signals.

Step 202: Perform channel estimation according to the reference signals.

Because no data signal is sent at the specific time-frequency lattice, the reference signal does not interfere with the data signal reciprocally, the UE can estimate the channel value between the UE and the cooperative APs accurately, and the UE performance is improved.

Figure 7A:
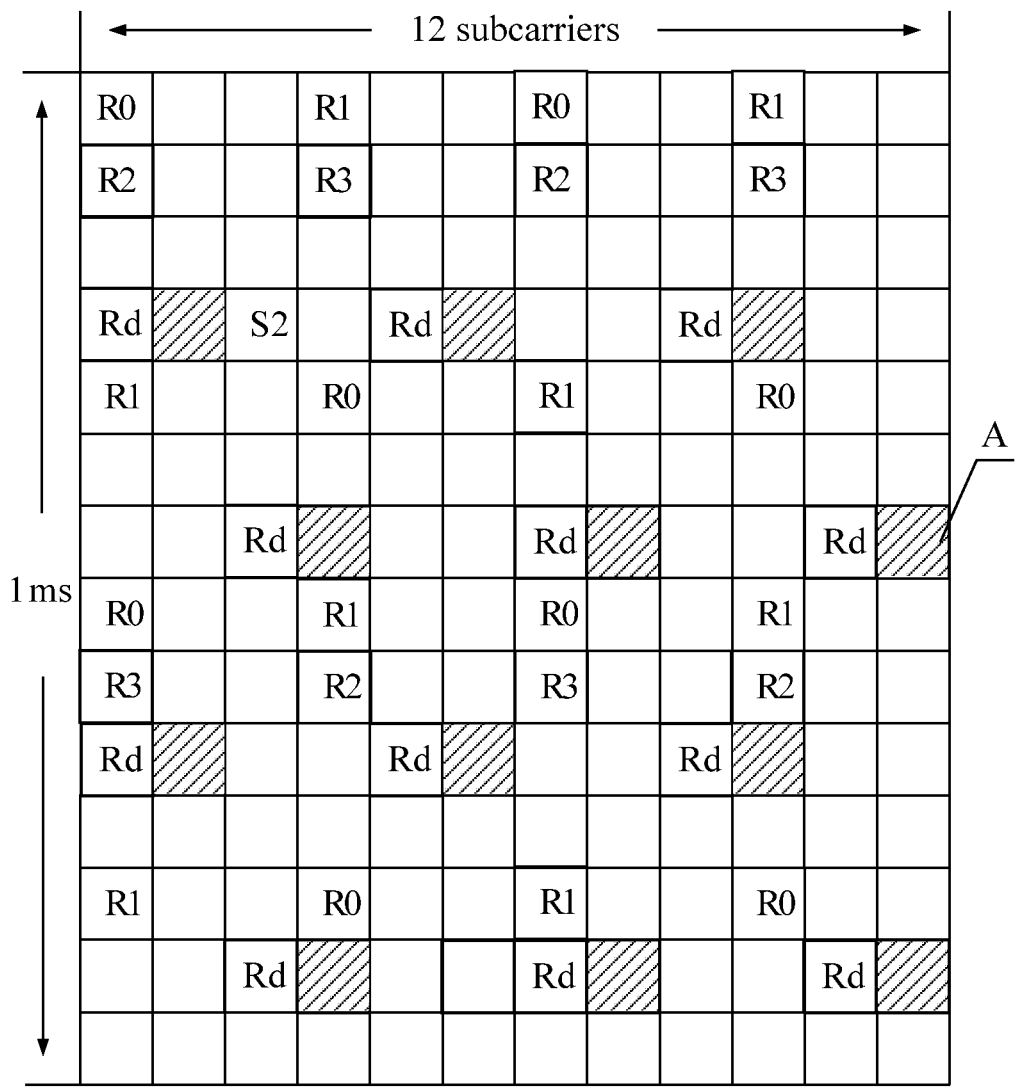
FIG. 7A shows reference signals of a first AP in another channel estimation method provided according to a second embodiment of the present disclosure.
Figure 7B:
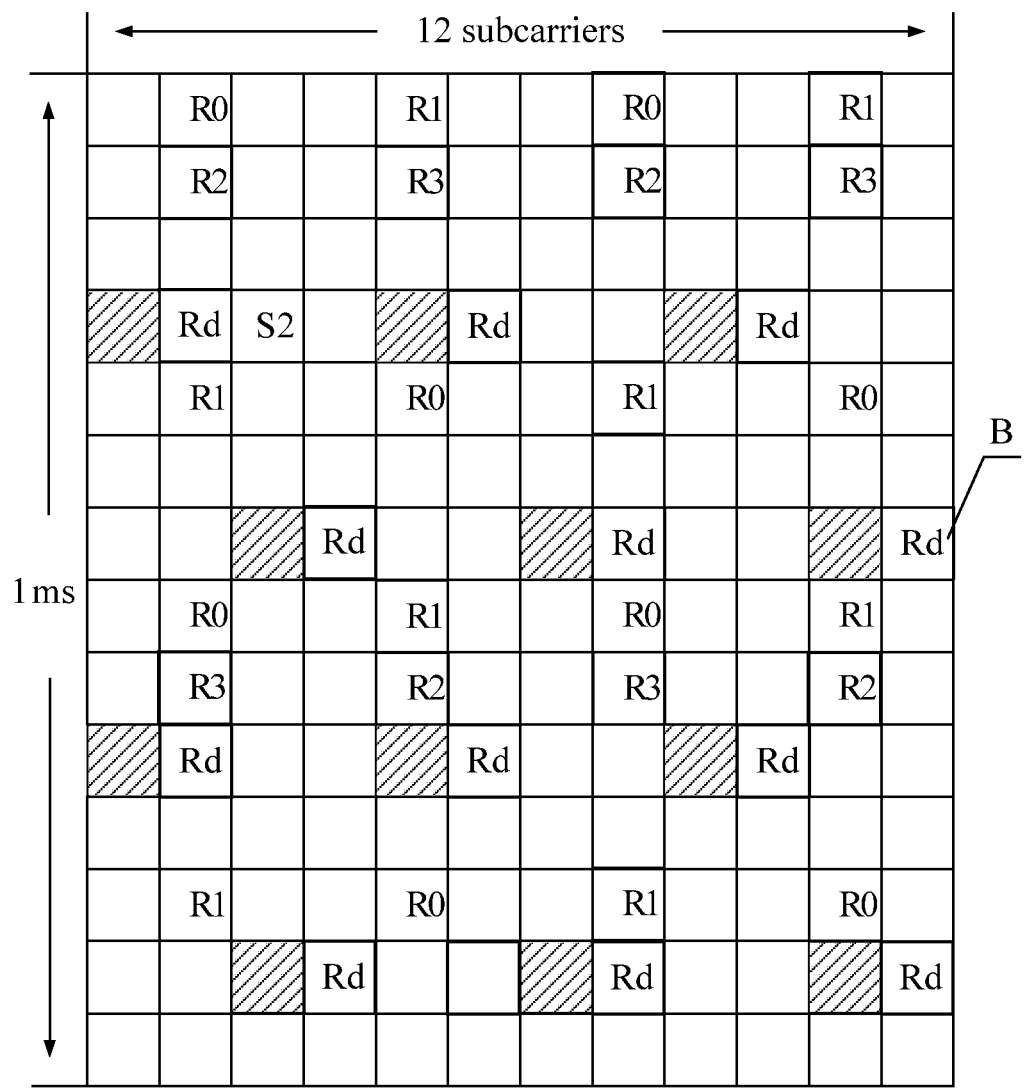
FIG. 7B shows reference signals of a second AP in another channel estimation method provided according to the second embodiment of the present disclosure.

The second embodiment of another channel estimation method is described below:

FIG. 7A and FIG. 7B show reference signals of a first AP and a second AP respectively in a channel estimation method in the second embodiment of the present disclosure. The processing method in this embodiment is the same as that in the first embodiment above.

Taking the dedicated reference signal as an example, it is assumed that any two APs among two or more APs are a first AP and a second AP. The two APs are the cooperative APs that serve the same UE. FIG. 7A and FIG. 7B show the reference signals of the first AP and the second AP respectively. In comparison with FIG. 1A, no data signal is sent at the specific time-frequency lattice (illustrated by the area filled with oblique lines in FIG. 7A) in the downlink signals of the first AP in FIG. 7A. The specific time-frequency lattice in FIG. 7A corresponds to the time-frequency lattice of the sent reference signal in FIG. 7B. For example, the specific time-frequency lattice A in FIG. 7A corresponds to the time-frequency lattice B in FIG. 7B. If the signal sent at time-frequency lattice B is a reference signal, no data signal is sent at the specific time-frequency lattice A. By analogy, in comparison with FIG. 1B, no data signal is sent at the specific time-frequency lattice (illustrated by the area filled with oblique lines in FIG. 7B) in the downlink signals of the second AP in FIG. 7B. The specific time-frequency lattice in FIG. 7B corresponds to the time-frequency lattice of the sent reference signal in FIG. 7A. In this way, when the cooperative APs send the same downlink signal to the UE to enhance the signal, the dedicated reference signal does not interfere with the data signal reciprocally, and the UE can estimate the channel value between the UE and the cooperative APs accurately according to the dedicated reference signal, and then estimate the aggregated channel. This embodiment is applicable to the scenario where two or more cooperative APs send the same data signal to the UE, and applicable to the scenario where two or more cooperative APs send different data signals to the UE.

Similar methods may be applied to eliminate the interference between the common reference signal and the data signal. For two or more APs (one is a first AP, and the other is a second AP), no data signal is sent at the specific time-frequency lattice corresponding to the common reference signal sent by the second AP in the downlink signals sent by the first AP. It should be noted that to ensure accuracy of control information, the specific time-frequency lattice sending no data signal may be located in the data channel symbol domain of the downlink signal. That is, the sending mechanism is not changed at the symbol domain corresponding to the downlink control channel, but is changed at a symbol domain other than the symbol domain corresponding to the downlink control channel; and no data signal is sent at the specific time-frequency lattice. This embodiment is applicable to the scenario where two or more cooperative APs send the same data signal to the UE, and applicable to the scenario where two or more cooperative APs send different data signals to the UE.

In this embodiment, the UE can receive the common reference signal according to the changed sending mechanism corresponding to the common reference signal, or receive the dedicated reference signal according to the changed sending mechanism corresponding to the dedicated reference signal, thus improving the UE performance effectively. Preferably, the sending mechanism of both the common reference signal and the dedicated reference signal is changed through the foregoing method to eliminate the interference between the common reference signal and the data signal as well as the interference between the dedicated reference signal and the data signal. In this way, the UE can estimate the channel value between the UE and the cooperative APs accurately, and improve the performance of the UE effectively.

That is, this embodiment can receive the downlink signals in which the dedicated reference signal has a relative frequency shift but the specific time-frequency lattice includes no data signal; or receive the downlink signals in which the common reference signal has a relative frequency shift but the specific time-frequency lattice includes no data signal; or receive the downlink signals in which the dedicated reference signal has a relative frequency shift, the specific time-frequency lattice of the dedicated reference signal includes no data signal, and the common reference signal has a relative frequency shift but the specific time-frequency lattice of the common reference signal includes no data signal.

The third embodiment of another channel estimation method is described below:

The processing method in this embodiment is the same as that in the first embodiment above. Specifically, the processed reference signals are dedicated reference signals; the practice of changing the sending mechanism of the dedicated reference signal in the second embodiment is also applicable in this embodiment. This embodiment differs in that: This embodiment changes the frequency shift of the common reference signal sent by either of the APs to achieve a zero relative frequency shift between the common reference signals sent by different APs and eliminate the interference between the common reference signal and the data signal. The combination of the two methods eliminates the interference between the common reference signal and the data signal, and the interference between the dedicated reference signal and the data signal. In this way, the UE can estimate the channel value between the UE and the cooperative APs accurately, and improve the performance of the UE effectively.

Similarly, the processed reference signals may be common reference signals, and the interference between the common reference signal and the data signal can be eliminated by changing the frequency shift.

The fourth embodiment of another channel estimation method is described below:

The processing method in this embodiment is the same as that in the first embodiment above. Specifically, the reference signals are dedicated reference signals; the practice of changing the sending mechanism of the dedicated reference signal in the second embodiment is also applicable in this embodiment. Differently, this embodiment uses an interference elimination method to eliminate the interference between the common reference signal and the data signal.

Similarly, the processed reference signals may be common reference signals, and the interference between the common reference signal and the data signal can be eliminated through an interference elimination method.

Figure 8:
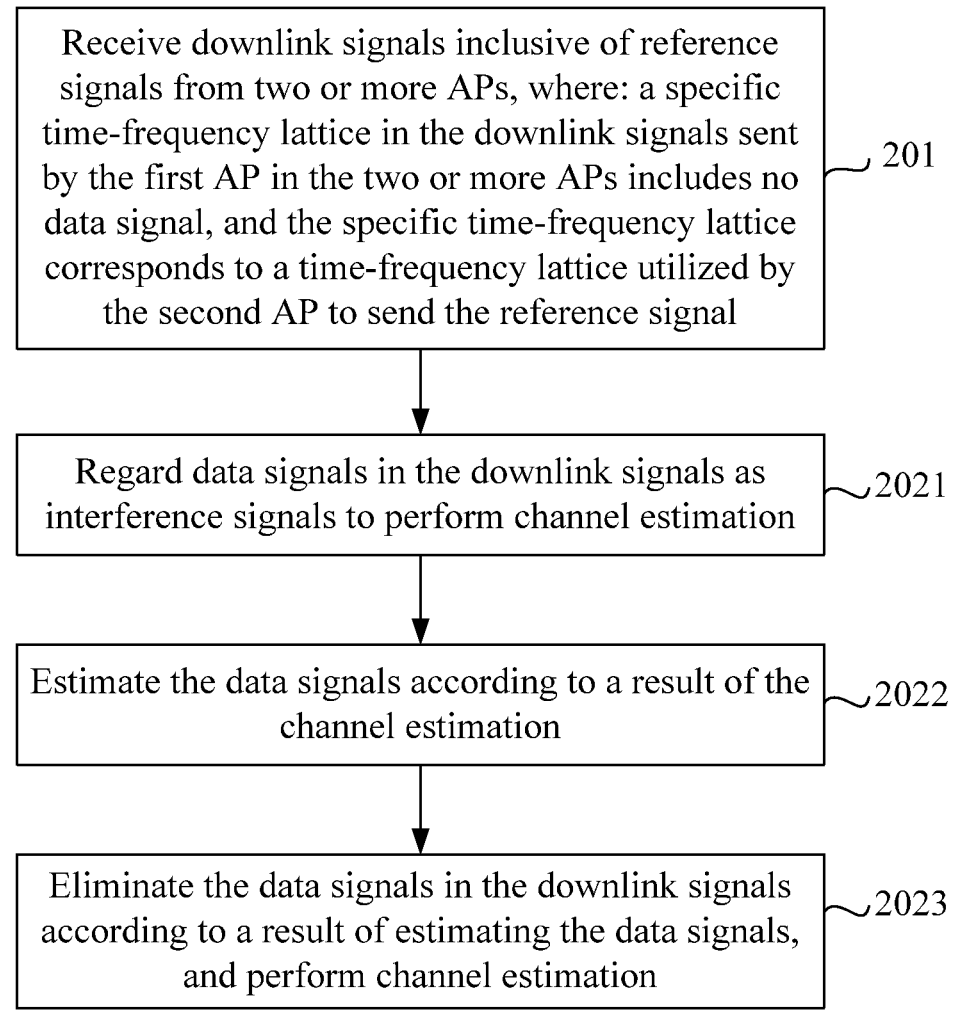
FIG. 8 is a flowchart of another channel estimation method provided according to a fourth embodiment of the present disclosure.

FIG. 8 is a flowchart of another channel estimation method provided in a fourth embodiment of the present disclosure. Step 202 in the first embodiment above may include steps 2021-2023. Steps 2021-2023 are the same as steps 1021-1023 in the previous embodiment.

The fifth embodiment of another channel estimation method is described below:

The processing method in this embodiment is the same as that in the first embodiment above. Specifically, the reference signals are dedicated reference signals; the practice of changing the sending mechanism of the dedicated reference signal is also applicable in this embodiment. This embodiment differs in that: No common reference signal is included in the data channel symbol domains except the preset symbol domain in the downlink signals, so that the interference between the common reference signal and the data signal can be eliminated. The combination of the two methods eliminates the interference between the common reference signal and the data signal, and the interference between the dedicated reference signal and the data signal. In this way, the UE can estimate the channel value between the UE and the cooperative APs accurately, and improve the performance of the UE effectively.

Further, to eliminate the interference between the common reference signal and the data signal in the preset symbol domain, this embodiment can change the frequency shift of the common reference signal in the preset symbol domain in either of the APs, and therefore, no relative frequency shift exists between the common reference signal in the preset symbol domain in one AP and the common reference signal in the preset symbol domain in the other AP.

In another embodiment, the interference elimination method in steps 2021-2023 are applied to further eliminate the interference between the common reference signal in the preset symbol domain and the data signal.

Figure 9:
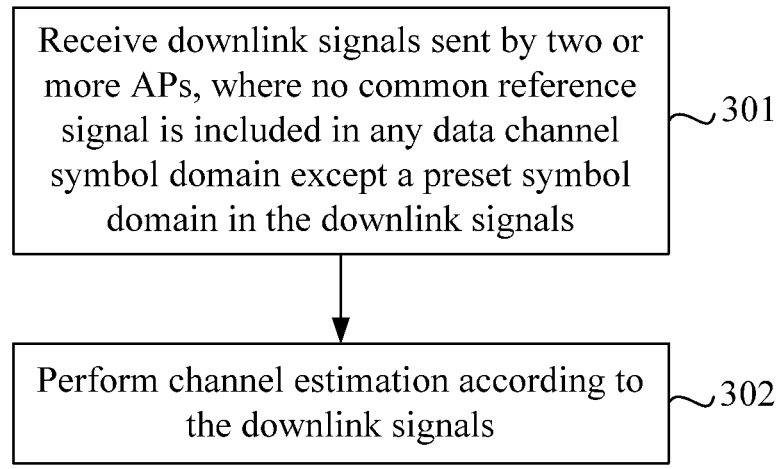
FIG. 9 is a flowchart of another channel estimation method provided according to a first embodiment of the present disclosure.

The first embodiment of another channel estimation method is described below:

FIG. 9 is a flowchart of another channel estimation method provided in a first embodiment of the present disclosure. This embodiment involves whether the cooperative APs send the common reference signal. The method includes the following steps:

Step 301: Receive downlink signals sent by two or more APs, where no common reference signal is included in any data channel symbol domain except a preset symbol domain in the downlink signals.

When this embodiment is applied in a CoMP system, the UE receives downlink signals sent by two or more APs. This embodiment changes the mode of the reference signals shown in FIG. 1A and FIG. 1B so that no common reference signal is included in any data channel symbol domain except the preset symbol domain in the downlink signals. The "preset symbol domain" refers to the symbol domain to be most probably occupied by the control channel. The cooperative APs send the reference signals to the UE according to the changed sending mechanism corresponding to the reference signals, and the UE receives the reference signals according to the receiving mechanism corresponding to the changed reference signals.

Step 302: Perform channel estimation according to the downlink signals.

Because no common reference signal is included in the data channel symbol domain, the common reference signal does not interfere with the data signal reciprocally, the UE can estimate the channel value between the UE and the cooperative APs accurately, and the UE performance is improved.

The second embodiment of another channel estimation method is described below:

The processing method in this embodiment is the same as the first embodiment of another channel estimation method except that the preset symbol domain of the downlink signals includes no common reference signal, namely, the dedicated reference signal instead of the common reference signal is sent from the control channel symbol domain and the data channel symbol domain of the currently scheduled subframe. Further, the common reference signal of the currently scheduled subframe can be estimated according to the common reference signal of the adjacent subframe not scheduled currently. In this way, the interference between the common reference signal and the data signal in the currently scheduled subframe is eliminated, and the interference between the common reference signal and the control signal is eliminated.

The third embodiment of another channel estimation method is described below:

The processing method in this embodiment is the same as the first embodiment of the channel estimation method, and the preset symbol domain of the downlink signals includes a common reference signal. The difference is that: No data signal is sent at certain time-frequency lattices of the preset symbol domain. Specifically, for the first AP and the second AP among the two or more APs, the specific time-frequency lattice of the preset symbol domain in the downlink signals sent by the first AP includes no data signal, and the specific time-frequency lattice corresponds to the time-frequency lattice of the common reference signal sent by the second AP.

Because the preset symbol domain is the symbol domain to be most probably occupied by the control channel, for certain subframes, the number of rows corresponding to the control channel symbol domain is less than the number of rows corresponding to the preset symbol domain. Therefore, the preset symbol domain may also include data signals. In this embodiment, to eliminate the interference between the data signal and the common reference signal in the preset symbol domain, no data signal is sent at the specific time-frequency lattice of the preset symbol domain.

All the embodiments above are applied to the UEs in cooperative mode. However, the embodiments of the present disclosure are applicable to the UEs in non-cooperative mode as well. When the channel estimation method is applied to both the UEs in cooperative mode and the UEs in non-cooperative mode, the system structure is simplified, and the system implementation is simpler. Moreover, in the embodiments of the present disclosure, the dedicated reference signals include, but are not limited to, the signals of port 5 in the existing LTE system; and may include dedicated reference signals added in the future.

In a CoMP system, some UEs communicate with one AP, and some UEs communicate with multiple APs simultaneously. Therefore, for an AP, the cooperative mode may be combined with the non-cooperative mode.

Figure 10:
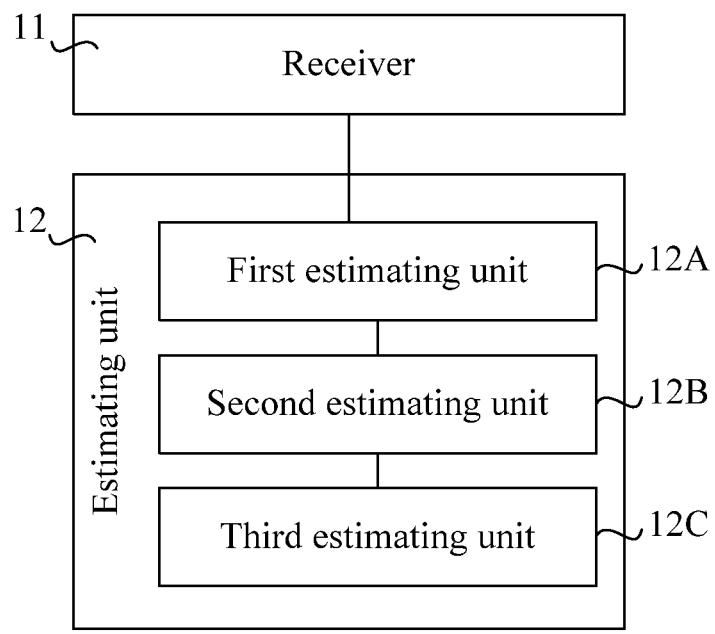
FIG. 10 shows a structure of a channel estimation apparatus provided according to an embodiment of the present disclosure.

An embodiment of a channel estimation apparatus is described below:

FIG. 10 shows a structure of a channel estimation apparatus provided in an embodiment of the present disclosure. The apparatus includes a receiving unit 11 and an estimating unit 12. The receiving unit 11 receives downlink signals inclusive of reference signals from two or more APs. The estimating unit 12 performs channel estimation according to the reference signals. To eliminate interference between the reference signal and the data signal, one practice is: The relative frequency shift between reference signals sent by different APs is zero; another practice is: For two or more APs (one is a first AP, and the other is a second AP), a specific time-frequency lattice in the downlink signals sent by the first AP includes no data signal, where the specific time-frequency lattice corresponds to the time-frequency lattice utilized by the second AP to send the reference signal. The two modes above are applicable to both common reference signals and/or dedicated reference signals. Another practice is: No common reference signal is included in any data channel symbol domain except a preset symbol domain in the downlink signals. This practice eliminates the interference between the reference signal and the data signal, enables the UE to estimate the channel value between the UE and the cooperative APs accurately, and improves the UE performance.

When the foregoing practice is applied to the dedicated reference signals but not applied to the common reference signals, the estimating unit 12 may include a first estimating unit 12A, a second estimating unit 12B, and a third estimating unit 12C. The first estimating unit 12A regards the data signals in the downlink signals as interference signals to perform channel estimation. The second estimating unit 12B estimates the data signals according to the result of channel estimation. The third estimating unit 12C eliminates the data signals in the downlink signals according to the result of estimating the data signals, and performs channel estimation.

It should be noted that several methods are provided herein to eliminate the interference between the reference signal and the data signal (see the method embodiments above), and that the channel estimation apparatus disclosed herein is applicable to any embodiment of the channel estimation method above.

The receiving unit is specifically configured to receive downlink signals inclusive of common reference signals from two or more APs, where the downlink signals include no dedicated reference signals.

Or, the receiving unit is specifically configured to receive downlink signals inclusive of dedicated reference signals from two or more APs, where no common reference signal is included in any data channel symbol domain except a preset symbol domain in the downlink signals.

Or, the receiving unit is specifically configured to receive downlink signals inclusive of dedicated reference signals from two or more APs, where: no common reference signal is included in any data channel symbol domain except a preset symbol domain in the downlink signals, and a relative frequency shift between the common reference signals included in the preset symbol domain is zero.

Or, the receiving unit is specifically configured to receive downlink signals inclusive of dedicated reference signals from two or more APs, where: the downlink signals further include common reference signals, and the relative frequency shift between the common reference signals sent by different APs is zero.

Or, the receiving unit is specifically configured to receive downlink signals inclusive of common reference signals from two or more APs, where the specific time-frequency lattice is located in the data channel symbol domain of the downlink signals.

Or, the receiving unit is specifically configured to receive downlink signals inclusive of reference signals from two or more APs, where: a preset symbol domain in the downlink signals includes common reference signals, a specific time-frequency lattice in a preset symbol domain in the downlink signals received from a first AP among the two or more APs includes no data signal, and the specific time-frequency lattice corresponds to a time-frequency lattice of a common reference signal sent by a second AP among the two or more APs.

An embodiment of a channel estimation system is described below:

The system includes a channel estimation apparatus, which is configured to receive downlink signals inclusive of reference signals from two or more APs and perform channel estimation according to the reference signals, where: a relative frequency shift between reference signals sent by different APs is zero; or, a specific time-frequency lattice in the downlink signals sent by a first AP among the two or more APs includes no data signal, and the specific time-frequency lattice corresponds to a time-frequency lattice utilized by a second AP among the two or more APs to send a reference signal; or, no common reference signal is included in any data channel symbol domain except a preset symbol domain in the downlink signals. The system in this embodiment eliminates the interference between the reference signal and the data signal, enables the UE to estimate the channel value between the UE and the cooperative APs accurately, and improves the UE performance.

Persons of ordinary skill in the art should understand that all or part of the steps of the method according to the embodiments of the present disclosure may be implemented by a program instructing relevant hardware. The program may be stored in computer readable storage media. When the program runs, the steps of the method specified in an embodiment of the present disclosure are performed. The storage media may be any media capable of storing program codes, such as a Read Only Memory (ROM), a Random Access Memory (RAM), a magnetic disk, or a Compact Disk-Read Only Memory (CD-ROM).

It is understandable to those skilled in the art that the accompanying drawings are only schematic diagrams of the preferred embodiments, and that the units or processes in the accompanying drawings are not mandatory for implementing the present disclosure.

It is understandable to those skilled in the art that the units in an apparatus provided in an embodiment of the present disclosure may be distributed into the apparatus described herein, or may be located in one or more apparatuses different from the apparatus described herein. The units may be integrated into one unit, or split into multiple subunits.

The serial number of each embodiment above is given for ease of description only and does not represent the order of preference of the embodiment.

The above descriptions are merely preferred embodiments of the present disclosure, but not intended to limit the scope of the present disclosure. Any modifications or variations that can be derived by those skilled in the art shall fall within the scope of the present disclosure.

What is claimed is:

1. A method performed by a base station for control an access point in a wireless communication network supporting coordinated multi-point transmission, comprising:

determining, by the base station, whether the coordinated multi-point transmission is activated; and sending, by the base station, a first control information to an access point, wherein the first control information instructs the access point not to send data on a resource element and a user equipment is served simultaneously by the access point and the another access point.

2. The method of claim 1, further comprising:

if the coordinated multi-point transmission is activated, sending second control information to the access point, wherein the second control information instructs the access point to send the data on a resource element where there is no reference signal transmitted by the another access point.

3. The method of claim 1, wherein the another access point is controlled by another base station.

4. The method of claim 1, wherein the resource element locates in a symbol of a channel for downlink data.

5. The method of claim 1, wherein the access point and the another access point transmit identical data to the user equipment.

6. The method of claim 1, wherein the access point and the another access point transmit different data to the user equipment.

7. The method of claim 1, wherein the reference signal is a dedicated reference signal.

8. The method of claim 1, wherein the reference signal is a public reference signal.

9. A base station, comprising:

a processor that determines that a coordinated multi-point transmission is activated; and a transmitter that sends first control information to an access point, wherein the first control information instructs the access point not to send data on a resource element where a reference signal is transmitted by another access point, and wherein a user equipment is served simultaneously by the access point and the another access point.

10. The base station of claim 9, wherein the processor is further configured to if the coordinated multi-point transmission is activated, send second control information to the access point, wherein the second control information instructs the access point to send the data on a resource element where there is no reference signal transmitted by the another access point.

11. The base station of claim 9, wherein the another access point is controlled by another base station.

12. The base station of claim 9, wherein the resource element locates in a symbol of a channel for downlink data.

13. The base station of claim 9, wherein the access point and the another access point transmit identical data to the user equipment.

14. The base station of claim 9, wherein the access point and the another access point transmit different data to the user equipment.

15. The base station of claim 9, wherein the reference signal is a dedicated reference signal.

16. The base station of claim 9, wherein the reference signal is a public reference signal.

* * * * *